United States Patent [19]

Iino

[11] Patent Number: 4,928,125

[45] Date of Patent: May 22, 1990

[54] LIQUID DROP EJECTION APPARATUS USING A MAGNETIC FLUID

[75] Inventor: Shuji Iino, Osaka, Japan

[73] Assignee: Minolta Camera Kabushiki Kaisha, Osaka, Japan

[21] Appl. No.: 248,391

[22] Filed: Sep. 23, 1988

[30] Foreign Application Priority Data

| | | | |
|---|---|---|---|
| Sep. 24, 1987 | [JP] | Japan | 62-240467 |
| Sep. 24, 1987 | [JP] | Japan | 62-240468 |
| Sep. 24, 1987 | [JP] | Japan | 62-240469 |
| Sep. 24, 1987 | [JP] | Japan | 62-240470 |

[51] Int. Cl.[5] .......... G01D 15/16; B41J 3/04

[52] U.S. Cl. .......... 346/140 R; 417/92

[58] Field of Search .......... 346/140, 74.2; 101/DIG. 37; 417/99, 92

[56] References Cited

U.S. PATENT DOCUMENTS

| | | | |
|---|---|---|---|
| 2,925,312 | 2/1960 | Hollmann | 346/140 X |
| 3,739,396 | 6/1973 | Harada | 346/140 |
| 3,916,419 | 10/1975 | Fan | 346/140 X |
| 4,271,416 | 6/1981 | Shimizu et al. | |
| 4,395,719 | 7/1983 | Majewski | 346/140 |
| 4,419,673 | 12/1983 | Ebi | 346/140 X |

FOREIGN PATENT DOCUMENTS

| | | |
|---|---|---|
| 161934 | 12/1979 | Japan . |
| 55-53573 | 4/1980 | Japan . |
| 55-67479 | 5/1980 | Japan . |
| 55-100159 | 7/1980 | Japan . |
| 55-121072 | 9/1980 | Japan . |
| 55-133971 | 10/1980 | Japan . |
| 55-156071 | 12/1980 | Japan . |
| 93478 | 5/1984 | Japan . |
| 4066 | 1/1985 | Japan . |
| 252166 | 11/1986 | Japan . |

OTHER PUBLICATIONS

Mitchell et al.; Nonlinear Field Accelerated Drop-On--Command Generator; IBM TDB, v. 21, N. 5, Oct. 1978, p. 2137.

*Primary Examiner*—Joseph W. Hartary
*Attorney, Agent, or Firm*—Burns, Doane, Swecker & Mathis

[57] ABSTRACT

A liquid-drop ejection apparatus for supplying a discharged fluid to a nozzle from a storage device and utilizing a magnetic fluid for ejecting the fluid in the form of drops from a discharge opening is disclosed.

8 Claims, 9 Drawing Sheets

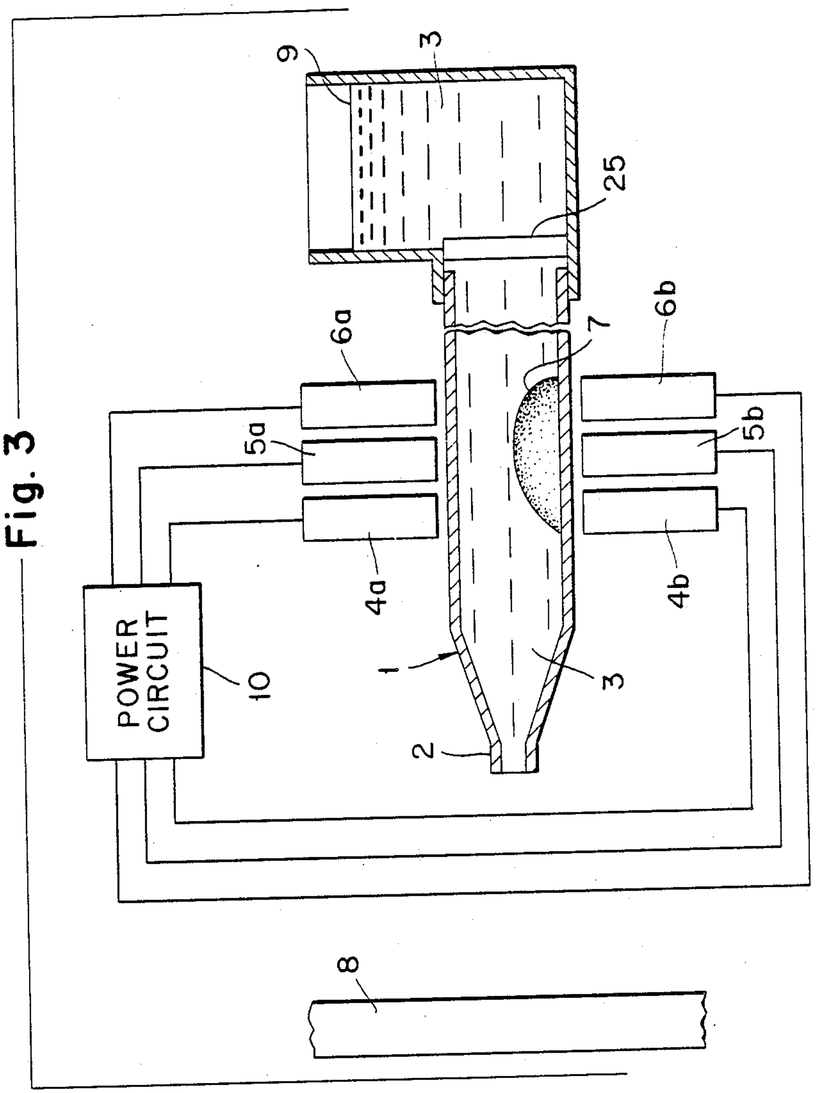
Fig. 3
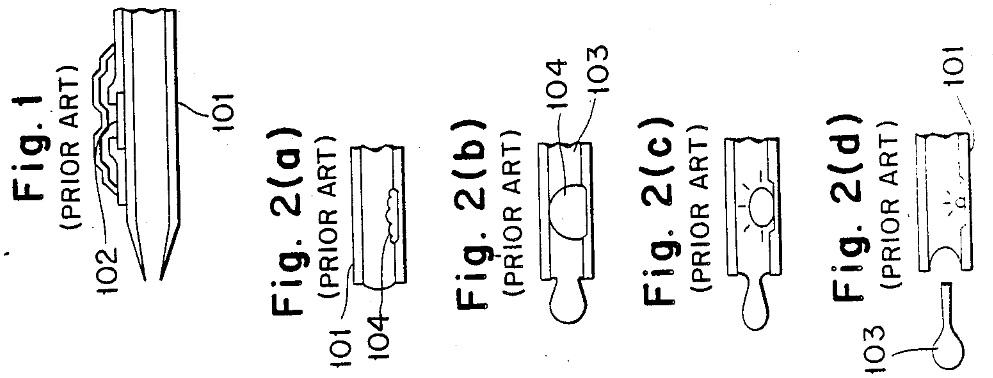
Fig. 1 (PRIOR ART)
Fig. 2(a) (PRIOR ART)
Fig. 2(b) (PRIOR ART)
Fig. 2(c) (PRIOR ART)
Fig. 2(d) (PRIOR ART)

LIQUID DROP EJECTION APPARATUS USING A MAGNETIC FLUID

BACKGROUND OF THE INVENTION (1) Field of the Invention

The present invention relates to a liquid-drop ejection apparatus, and more particularly to a liquid-drop apparatus containing a magnetic fluid in a nozzle.

(2) Description of Related Art

As a device for outputting character image information, various types of printer such as impact type (dot type and shuttle type), electrostatic recording type, thermal recording type, ink jet type and laser beam electrophotography type have been put into practical use. With these output devices, compactness, reduction in weight, color representation, no maintenance, low cost, low noise, high speed and high resolution are required. The ink jet type printer meets the requirements such as compactness, reduction in w eight, color representation, low cost and high speed most sufficiently and therefore, expectations are placed on it.

An ink jet head employed in the ink jet type printer has a construction wherein a nozzle connected with a storage device is pressurized by pressurizing means to eject ink as a discharged fluid.

(1)With the ink jet head of this type, however, it is difficult to keep the amount of the discharged fluid constant if the ink present in the nozzle is movable to the storage device at the pressurizing time. Consequently, a nozzle opening/closing means for opening and closing an ink passage in the nozzle is provided between the pressurizing means and the storage device. This mechanical opening and closing of the nozzle easily lead to trouble, thereby having low reliability. In addition, this requires a complicated construction, thereby having a disadvantage of high manufacturing cost of the ink jet head.

(2)With the ink jet head also, properties of the ink in the nozzle change with temperature change even if the nozzle is pressurized under the same pressure. This causes change of the amount of the discharged ink, whereby a recorded image has problems of uneven density or low reproducibility of tones in a multi-tone image.

(3)The discharge opening of the nozzle is open when the apparatus is not operated after the ink is ejected from the nozzle. Therefore, the ink in the nozzle contacts outside air and is dried at the discharge opening, resulting in nozzle plugging.

The three problems mentioned above are not limited to the ink jet head but are common to any liquid-drop ejection apparatus injecting fluid from the nozzle by use of the pressurizing means.

Next, the ink jet type printer is divided into two types, namely, pulse pressure type and bubble jet type. The pulse pressure type is a method wherein liquid drops are ejected without deflection from the nozzle by pressure waves generated by a piezoelectric element. On the other hand, the bubble jet type is a method wherein bubbles are generated by heating a heating resistance element buried in the nozzle and ink drops are ejected from the nozzle using the force with which the bubbles extend.

A head of the above bubble jet type printer has a construction wherein the heating resistance element 102 is buried in the nozzle 101 as shown in FIG. 1. According to the ink ejection principle of this head, bubbles 104 generated within the nozzle 101 by heating the heating resistance element 102 expand as shown in FIGS. 2(*a*) and 2(*b*), and the ink 103 is injected from the nozzle 101 by the expanded bubbles as shown in FIGS. 2(*c*) and 2(*d*).

However, the bubble jet type printer entails a problem of deterioration of ink because the head is heated by the heating resistance element.

SUMMARY OF THE INVENTION

A first object of the present invention, therefore, is to provide a rational liquid-drop ejected apparatus capable of preventing deterioration of a discharged fluid and being driven with low voltage.

A second object of the present invention is to provide a liquid-drop ejected apparatus enabling low power consumption and compactness.

A third object of the present invention is to provide a liquid-drop ejected apparatus easily enabling multi-coloring.

A fourth object of the present invention is to provide a liquid-drop ejected apparatus capable of preventing trouble at nozzle opening/closing times and having high reliability.

A fifth object of the present invention is to provide a liquid-drop ejected apparatus of low cost by simplifying the nozzle opening/closing construction.

A sixth object of the present invention is to provide a liquid-drop ejected apparatus capable of maintaining an amount of discharged fluid constant in spite of temperature change of the discharged fluid.

A seventh object of the present invention is to provide a liquid-drop ejected apparatus capable of recording in multi-tones.

An eighth object of the present invention is to provide a liquid-drop ejection apparatus capable of closing a nozzle in order to prevent air from penetrating into the nozzle when the apparatus is not operated.

The above first to third objects are fulfilled by a liquid-drop injection apparatus according to the present invention comprising a magnetic fluid contained in a flow passage in the nozzle, and means for ejection the discharged fluid from a discharge opening including, means for deforming the magnetic fluid by applying a magnetic force outside the flow passage and means for moving the deformed magnetic fluid along the flow passage in order to eject the discharged fluid from the discharge opening.

The means for deforming the magnetic fluid may comprise a pair of electromagnets opposed to each other with the nozzle in between.

The means for moving the deformed magnetic fluid may comprise a plurality of electromagnets disposed along the flow passage and a power circuit for changing electrification timing of the electromagnets.

The means for deforming the magnetic fluid may generate a magnetic field crossing the flow passage and deforms the magnetic fluid in order to close the flow passage, when the magnetic fluid is required to approach the discharge opening.

The means for deforming the magnetic fluid may also generate a magnetic field substantially parallel to the flow passage and deforms the magnetic fluid in order to open the flow passage, when the magnetic fluid is required to separate from the discharge opening.

The reason why the above objects are fulfilled by the present invention is as follows.

The fluid passage such as a nozzle is not heated because the discharged fluid such as ink is ejected by effecting deformation and movement of a magnetic fluid by magnetic force. Further, the heating element such as a heating resistance element need not be provided in the fluid passage.

The above fourth to fifth objects are fulfilled by a liquid-drop ejection apparatus according to the present invention comprising pressurizing means for pressurizing the discharged fluid in the nozzle, a magnetic fluid disposed in the nozzle between the pressurizing means and the storage device, and magnetic force generating means for applying a magnetic force to the magnetic fluid, to cause the magnetic fluid to form a pressure chamber by closing the flow passage when the pressurizing means is in operation, and to cause the magnetic fluid to make the flow passage communicate with the discharge opening when the pressurizing means is not in operation.

The magnetic force generating means may comprise a pair of electromagnets opposed to each other with the nozzle in between.

The pressurizing means may comprise a piezoelectric element.

The reason why the above objects are fulfilled by the present invention is as follows.

A range over which the pressurizing means effects its influence is limited to the space within the nozzle between the discharge opening and the magnetic fluid because the passage in the nozzle is closed by the magnetic fluid by the magnetic force generating means when the pressurizing means operates. Accordingly, the discharged fluid is not moved to the storage device and the opening/closing mechanism of the passage in the nozzle can be simplified.

The above sixth to seventh objects are fulfilled by a liquid-drop injection apparatus according to the present invention comprising a magnetic fluid contained in the nozzle between pressurizing means for pressurizing the discharged fluid and the discharge opening, and means for allowing a flow resistance to be variable including, means for applying a magnetic field to the magnetic fluid and means for changing the magnetic field applied to the magnetic fluid.

The means for applying a magnetic field to the magnetic fluid may comprise a pair of electromagnets opposed to each other with the nozzle in between.

The means for changing the magnetic field applied to the magnetic fluid may comprise a plurality of pairs of electromagnets disposed along the flow passage in the nozzle and a power circuit for changing electrification timing of the pairs of the electromagnets.

The reason why the above objects are fulfilled by the present invention is as follows.

Since the configuration of the magnetic fluid is changed by changing the magnetic field applied to the magnetic fluid in the nozzle in order to control the fluid resistance of the discharged fluid, the magnetic field can be changed in accordance with the temperature change of the discharged fluid. And the amount of discharged fluid can be changed in accordance with the number of tones if the magnetic field applied to the magnetic fluid is changed in accordance with tone signals.

The above eighth object is fulfilled by a liquid-drop ejection apparatus according to the present invention comprising a magnetic fluid contained in a portion of a flow passage in the nozzle, means for preventing the discharged fluid from contacting air by the magnetic fluid by applying a magnetic field crossing the flow passage in the nozzle near the discharge opening when the apparatus is not operated, and means for allowing the magnetic fluid to retract to a recess of the nozzle when the apparatus is not operated.

The means for preventing the discharged fluid from contacting air by the magnetic fluid may comprise a pair of permanent magnets opposed to each other with the nozzle in between.

The reason why the above object is fulfilled by the present invention is that the liquid-drop ejection apparatus according to the present invention is provided near the discharge opening with the means which applies the magnetic field crossing the flow passage in the nozzle and prevents air from contacting the discharged fluid.

BRIEF DESCRIPTION OF THE DRAWINGS

Theses and other objects, advantages and features of the invention will become apparent from the following description thereof taken in conjunction with the accompanying drawings which illustrate a specific embodiment of the invention. In the drawings:

FIG. 1 is a schematic vertical section of a head employed in a conventional bubble jet type printer.

FIG. 2 is a schematic view showing the ejection principle of the above printer.

FIG. 3 is a schematic vertical section of an ink jet recording head of a first embodiment.

DESCRIPTION OF THE PREFERRED EMBODIMENTS

[First Embodiment]

Figure 4A:
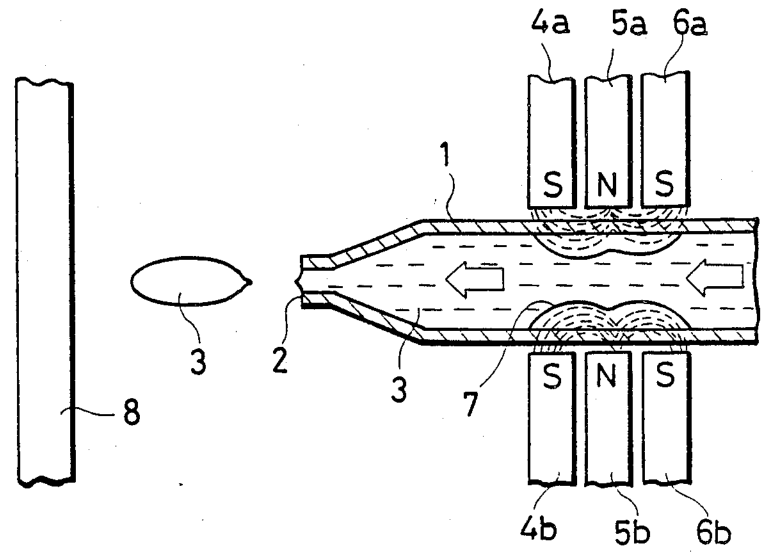
FIGS. 4(*a*) and 4(*b*) are explanatory views showing increasing and decreasing conditions of the ejected amount of ink.

A first embodiment of the present invention will be described hereinafter referring to FIGS. 3, 4(*a*) and 4(*b*).

FIG. 3 is a schematic vertical section where the present invention is applied to an ink jet recording head. Number 1 indicates a nozzle and an end of the nozzle 1 (lefthand in the drawings) tapers off to form an orifice 2 having a bore diameter of 100 micrometers. At an interval of about 4mm from the end of the orifice 2, a recording paper 8 is disposed. On the other hand, an inkpot 9 is disposed at the rear end of the nozzle 1 and ink 3 is supplied from the inkpot 9 to the nozzle 1. A pressurizing means 25 for ejecting the ink by pressurizing the ink in the nozzle is provided between the inkpot 9 and the nozzle 1. As the pressurizing means, known means such as a piezoelectric vibrator provided on an external wall of the nozzle (pulse pressure type) or a heating resistance element (bubble jet type) is employed. Three pairs of electromagnets 4*a*, 4*b*, 5*a*, 5*b* and 6*a*, 6*b* (coils are not shown) are disposed longitudinally of the nozzle 1 in such a manner that the two electromagnets in each pair are opposed with the nozzle 1 in between. The polarity at the nozzle side of each electromagnet 4*a*, 4*b*, 5*a*, 5*b*, 6*a* or 6*b* can properly be changed by a power circuit. The nozzle 1 is formed of a non-magnetic material such as austenitic stainless steel.

A magnetic fluid 7 is contained in the nozzle 1 on which magnetic forces generated by the electromagnets 4*a*, 4*b*, 5*a*, 5*b*, 6*a* and 6*b* have influence. The magnetic fluid 7 comprising a magnetic liquid should be lipophilic when the ink 3 is hydrophilic and, conversely, should be hydrophilic when the ink 3 is lipophilic. When the ink 3 is lipophilic and has a surface tension of 20dyn/cm and a viscosity of 17cp, for example, MARPOMAGNA FW-40 (Matsumoto Yushi-Seiyaku Co., Ltd.) was used as the magnetic fluid. This prevents the ink 3 from being mixed with the magnetic fluid 7.

Figure 4B:
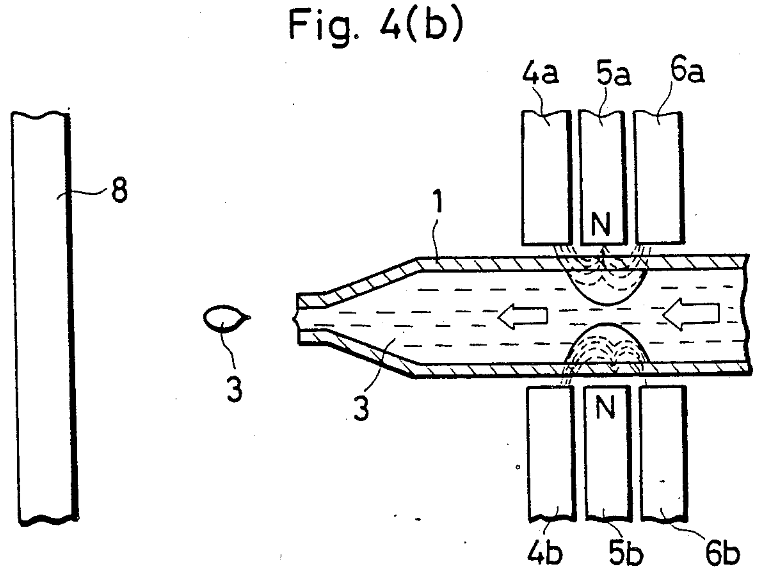

The power circuit 10, as shown in FIGS. 4(*a*) and 4(*b*), changes the magnetic pole at the nozzle side of the electromagnets 4*a*, 4*b*, 5*a*, 5*b*, 6*a*, and 6*b* in accordance with increase/decrease requirements of the ink amount to be ejected. That is, where the amount of ejected ink should be increased, polarities of three pairs of the electromagnets 4*a*, 4*b*–6*a*, 6*b* are changed in such a manner that the opposed poles have the same polarity and the sideways adjacent ones have different polarities. As a result, the composite magnetic field of the three pairs of the electromagnets focuses on the portion near the passage wall in the nozzle as indicated by a broken line in FIG. 4(*a*), whereby the magnetic fluid is deformed. Consequently, the area of the passage through which the ink passes becomes larger and the amount of ejected ink increases. On the other hand, where the amount of ejected ink should be decreased, only the middle pair of electromagnets 5*a*, 5*b* are electrified to allow the opposed poles to have the same polarity. In this case, although the magnetic field focuses on the portion near the passage wall in the nozzle as indicated by a broken line in FIG. 4(*b*), the degree of focus is less intense than in FIG. 4(*a*). As a result, the magnetic fluid is deformed in accordance with the distribution of the magnetic field, thereby increasing the fluid resistance to the ink. Thus, the amount of ejected ink is decreased.

Although not shown, instructions for the above increase/decrease of the amount of ejected ink is given by, for example, detecting the temperature of ink or the size of ink drop ejected on the recording paper by a detector and applying the detection to the power circuit. With a printer in which recording is effected with tones, tone signals may be used as the instructions.

In the above embodiment, the fluid resistance is controlled by changing the number of pairs of electromagnets to be electrified. The fluid resistance may also be controlled by varying the electrifying current while keeping the number of pairs of electromagnets constant.

[Second Embodiment]

A second embodiment of the present invention will be described hereinafter referring to FIGS. 5 and 6. The same elements as in the first embodiment are indicated by the same numbers and their explanation will be omitted.

Figure 5:
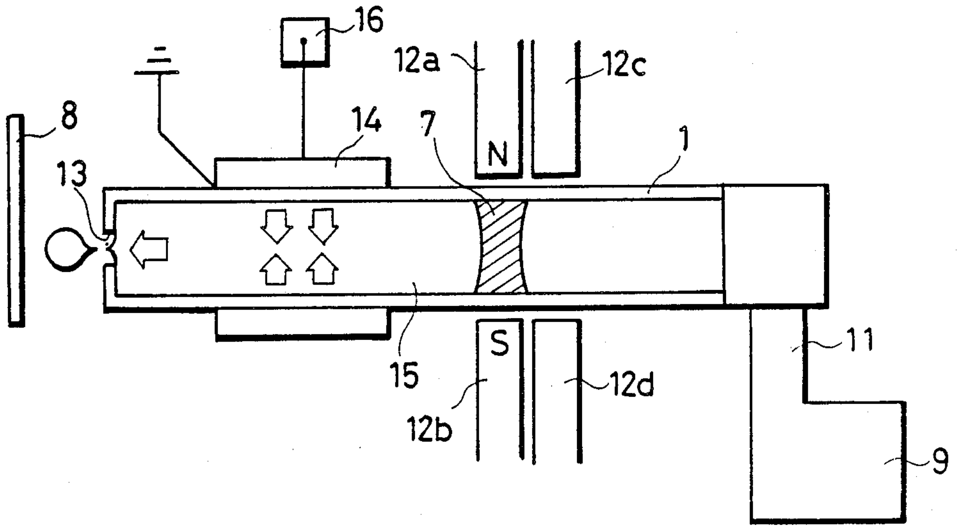
FIG. 5 is an explanatory view showing an ejection time of the ink jet recording head of a second embodiment.
Figure 6:
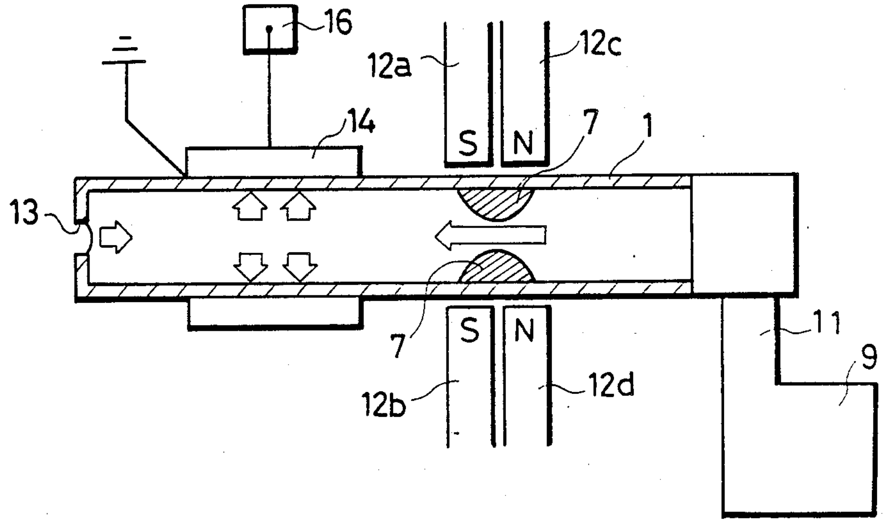
FIG. 6 is an explanatory view showing an ink supplying time of the ink jet recording head of the second embodiment.

As shown in FIG. 5, the inkpot 9 containing the ink is connected with nozzle 1 through an ink supplying passage 11. While the magnetic fluid 7 is disposed in the nozzle 1, electromagnets 12*a*–12*d* for controlling whether the magnetic fluid 7 should divide the passage in the nozzle 1 or not are provided near an outer periphery of the nozzle 1. The electromagnet 12*a* is opposed to the electromagnet 12*b* with the nozzle 1 in between and the electromagnets 12*c* to 12*d*. The outer periphery of the nozzle 1 between the electromagnets 12*a*–12*d* and the discharge opening 13 is surrounded by a cylindrical piezoelectric element 14 for pressurizing the nozzle 1. Voltage is applied to the piezoelectric element 14 by a driving power source 16.

In the above construction, a liquid-drop ejection apparatus according to the present invention is operated as follows.

First, where the ink is required to be ejected from the discharge opening 13 to adhere to the recording paper 8, voltage is applied to the electromagnets 12*a* and 12*b* so that the polarity of the nozzle side pole of the electromagnet 12*a* is N and that of the electromagnet 12*b* is S. Accordingly, lines of magnetic force are formed from the electromagnet 12*a* to the electromagnet 12*b*, whereby the magnetic fluid 7 is magnetized to be placed on the line between the electromagnets 12*a* and 12*b*. As a result, the passage in the nozzle 1 is divided into two portions by the magnetic fluid 7. Next, voltage is applied to the piezoelectric element 14 by the driving power source 16. Accordingly, the nozzle 1 is pressed toward its axis, whereby the ink in a pressure chamber 15 formed by the magnetic fluid 7 and the portion of the nozzle 1 which is close to the discharge opening 13 is pressurized. At this time, the magnetic fluid prevents the ink in the pressure chamber 15 from moving to the inkpot 9. The ink is ejected from the discharge opening 13 in an amount corresoponding to the voltage applied by the driving power source 16 and adheres to the recording paper 8. In the above case, the electromagnets 12*c* and 12*d* are not applied with the voltage, thereby not having On the other hand, after the ink is ejected, voltage is applied to the electromagnets 12*a* and 12*b* so that the polarity of the nozzle side pole of the electromagnet 12*a* is S contrary to the above ejection time and that of the electromagnet 12*b* is S as in the above ejection time. Further, the electromagnets 12*c* and 12*d* not having been magnetized at the ejection time are applied voltage so that the polarities of the nozzle side poles are N. Thus, lines of magnetic force are formed from the electromagnet 12*a* to the electromagnet 12*c* and from the electromagnet 12*b* to the electromagnet 12*d*. Therefore, the magnetic fluid 7 is divided to be placed on the semicircular plane between the electromagnet 12*a* and the electromagnet 12*c* and on the semicircular plane between the electromagnet 12*b* and the electromagnet 12*d*. Consequently, the nozzle having been divided by the magnetic fluid is placed in communication. Next, the voltage application to the piezoelectric element 14 is stopped and the nozzle 1 begins to return to the former state. This leads to a reduction in the pressure within the nozzle 1, whereby a further amount of ink is supplied to the nozzle 1. At this time, air is prevented from penetrating into the discharge opening 13 by the surface tension of the ink because the discharge opening has a small bore diameter, whereby the ink is positively supplied to the nozzle 1 from the inkpot 9.

In the above embodiment, electromagnets 12a–12d were employed as the magnetic force generating means. The present invenion is not limited to this but a permanent magnet, for example, may be employed. In this case, the same operation as in the above embodiment is carried out by allowing the permanent magnet to be movable to and from the nozzle 1.

The pressurizing means is not limited to the piezoelectric element 14 used in the above embodiment but may comprise a heating resistance element as in the bubble jet type.

In addition, the number of electromagets is of course not limited to four as in the above embodiment.

[Third Embodiment]

Figure 7:
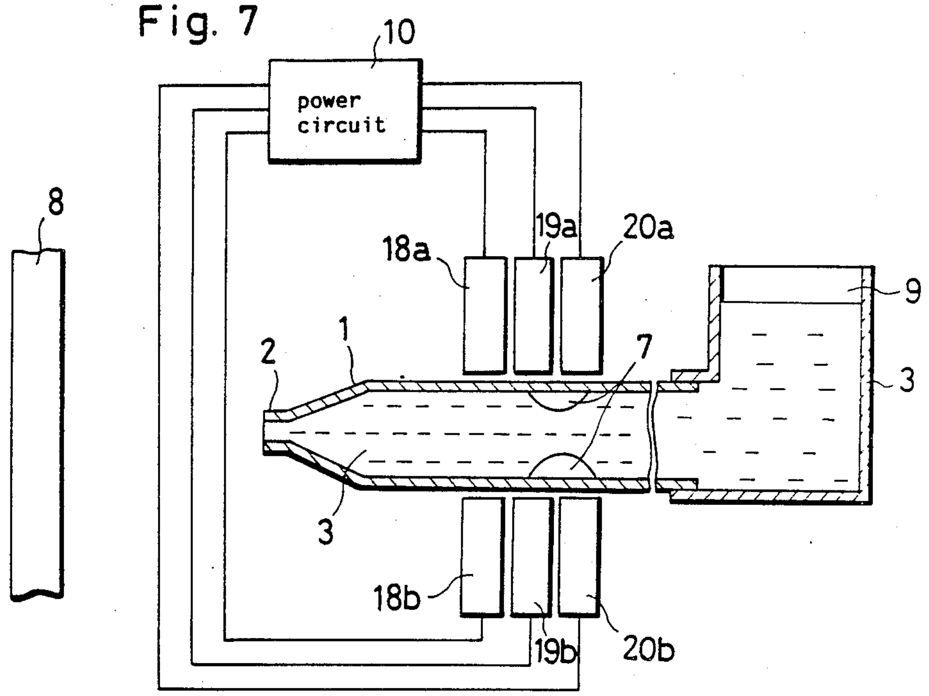
FIG. 7 is a schematic vertical section of the ink jet recording head of a third embodiment.

A third embodiment of the present invention will be described hereinafter referring to FIGS. 7–9. The same elements as in the first embodiment are indicated by the same numbers and their explanation will be omitted.

Three pairs of electomagnets 18a, 18b, 19a, 19b, 20a and 20b (coils are not shown) are disposed longitudinally of the nozzle 1. The polarity of the nozzle side pole of each electromagnet can be changed by a power circuit 10. The magnetic fluid 7 is contained in the nozzle on which the magnetic forces generated by the electromagnets 18a, 18b, 19a, 19b, 20a and 20b have influence.

Figure 8:
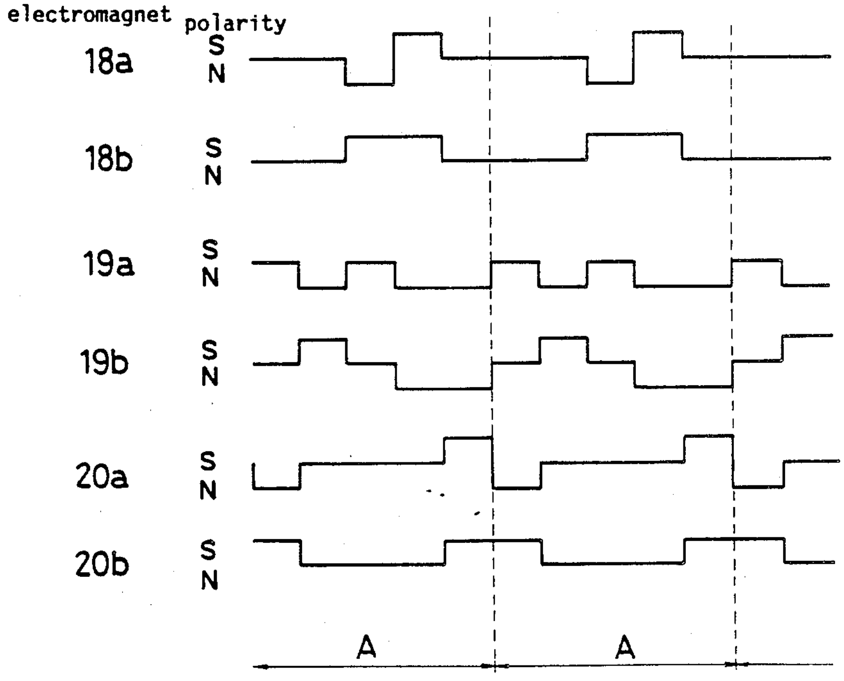
FIG. 8 is a time chart showing control of a power circuit.
Figure 9A:
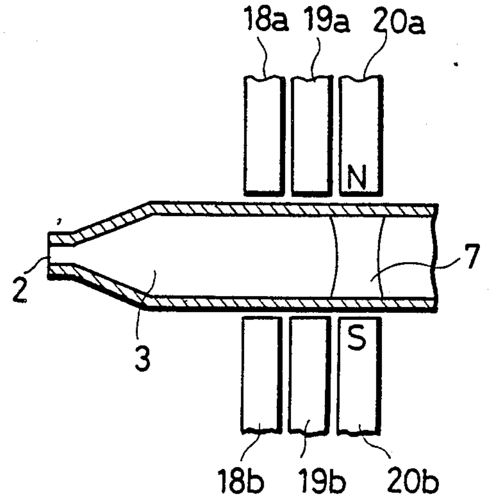
FIGS. 9(*a*)–9(*e*) are schematic vertical sections showing an ejection process of the discharged fluid.
Figure 9B:
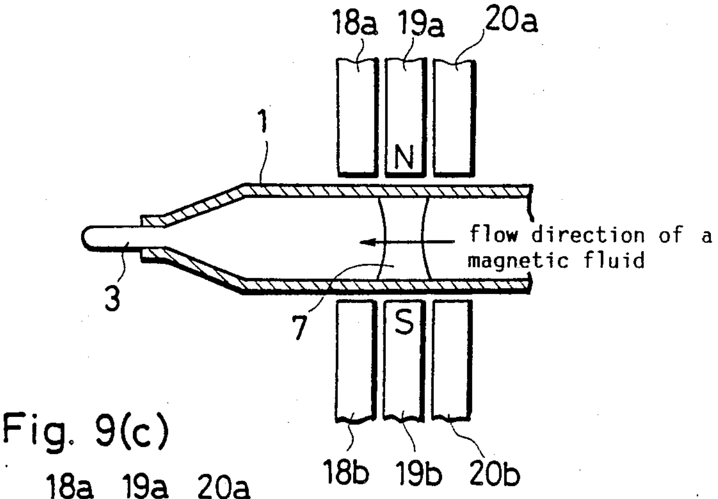
Figure 9C:
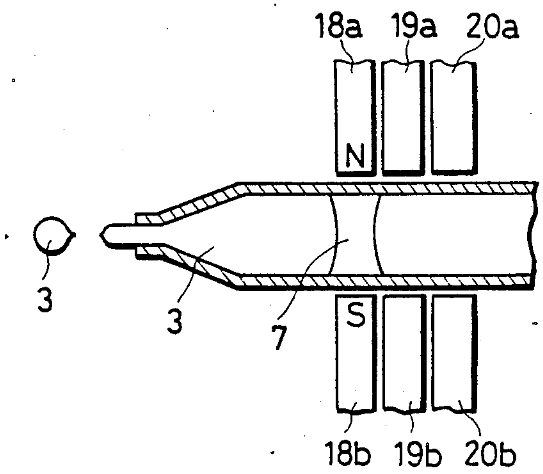
Figure 9D:
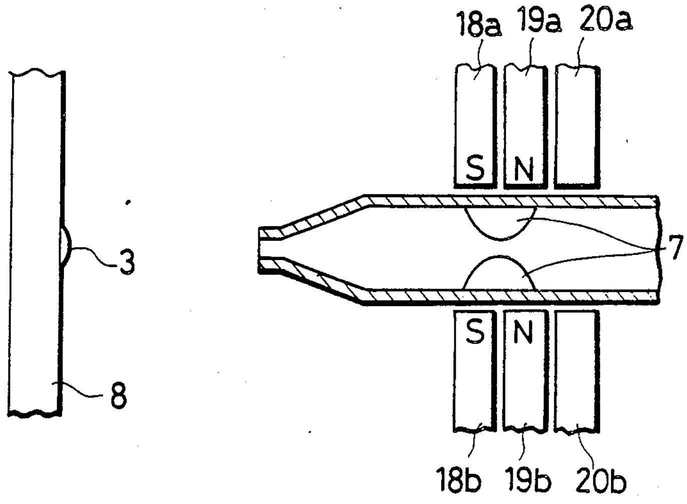
Figure 9E:
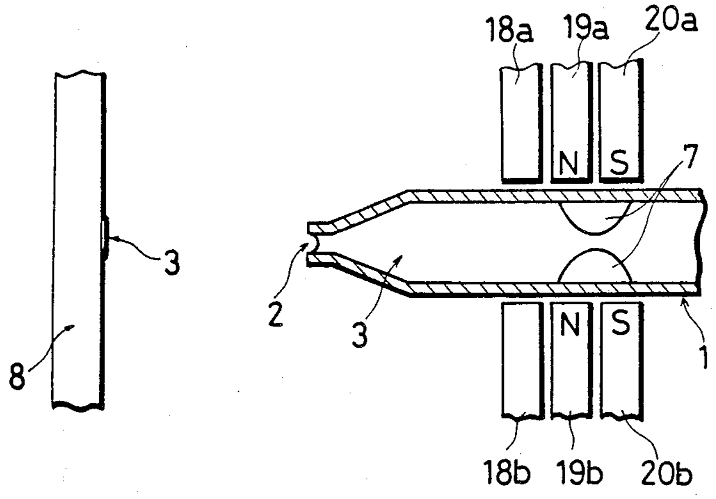

The power circuit 10 changes, with lapse of time, the pole characteristics of the nozzle side poles of the electromagnets 18a, 18b, 19a, 19b, 20a and 20b as shown in FIG. 8 (time chart). This change is repeated cycle by cycle as indicated by A in the drawing. During one cycle period A, the electromagnets 18a, 18b, 19a, 19b, 20a and 20b, and the magnetic fluid 7 change as shown in FIGS. 9(*a*), 9(*b*), 9(*c*), 9(*d*) and 9(*e*).

The above changes will be described hereinafter. First, the electromagnets 18a, 18b, 19a, 19b, 20a and 20b are not electrified and the electromagnets 20a and 20b are electrified so that the polality of the nozzle side pole of the electromagnet 20a is N and that of the electromagnet 20b is S (opposite poles are unlike-poles). Therefore, lines of magnetic force are formed from the electromagnet 20a to the electromagnet 20b as shown in FIG. 9(*a*). That is, a magnetic passage crossing the ink transporting direction substantially at right angles is formed in the nozzle 1, whereby the magnetic fluid 7 close the nozzle at the middle portion thereof.

In order to secure this closing, it is preferable to use the electromagnet having a length larger than the bore diameter of the nozzle 1.

Next, the electromagnets 18a, 18b, 20a and 20b are not electrified and the electromagnets 19a and 19b are electrified so that the polarity of the nozzle side pole of the electromagnet 19a is N and that of the electromagnets 19b is S (opposite poles are unlike-poles). Then, the magnetic fluid having been under the influence of the lines of the magnetic force generated by the electromagnets 20a and 20b is moved to the orifice 2 while remaining in the form closing the nozzle 1.

Then, the electromagnets 19a, 19b, 20a and 20b are not electrified and the electromagnets 18a and 18b are electrified so that the polarity of the nozzle side pole of the electromagnet 18a is N and that of the electromagnet 18b is S (opposite electrode are unlike-poles). Accordingly, the magnetic fluid 7 having been under the influence of the lines of magnetic force generated by the electromagnets 19a and 19b is moved to the orifice 2 by a predetermined distance while remaining in the form closing the nozzle.

Therefore, the capacity of the nozzle 1 between the magnetic fluid 7 closing the nozzle 1 and the orifice 2 becomes small, whereby the ink 3 is ejected from the orifice 2 to the recording paper 8. The ejection amount can be determined on the basis of the intervals among the three pairs of the electromagnets, the surface tension of the ink 3 against the inner surface of the nozzle 1 and so on.

Thereafter, that is to say, after the ejection the electromagnets 18a and 18b are electrified so that the polarities of the nozzle side poles are S and the electromagnets 19a and 19b are electrified so that the polarities of the nozzle side poles are N while the electromagnets 20a and 20b remain unchanged. Lines of magnetic force are formed between the adjacent electromagnets 19a and 18a and between the electromagnets 19b and 18b. That is, two magnetic passages substantially parallel to the ink flowing direction are formed in the nozzle 1, whereby the magnetic fluid 7 is divided into two portions by the two magnetic passages. Thus, the ink 3 in the nozzle 1 is conducted.

Then, the electromagnets 20a and 20b are electrified so that polarities of the nozzle side poles are S (opposite poles are like-poles), while the electromagnets 18a and 18b are not electrified and 19a and 19b remain unchanged. The magnetic fluid 7 is moved to the entrance of the nozzle 1 in the form divided into two portions as shown in FIG. 9(*e*).

In the next cycle, the process goes back to the state shown in FIG. 9(*a*) in which the ink 3 can be ejected intermittently. After that, the same process as the prior cycle is repeated. This one cycle corresponds to one dot recording.

In the above embodiment, the electromagents are electrified after the ejection in such a manner that the opposite poles of the electromagnets are like-poles and the adjacent poles of the electromagnets are unlike-poles. The present invention is not limited to this and only one pair of electromagnets may be electrified. In this case also, two magnetic passages substantially parallel to the ink flowing direction are formed in the nozzle 1. Further, the adjacent electomagnets of two pairs of the electromagnets may be electrified to form a magnetic passage in order to move the magnetic fluid to one side. It is also possible to electrify one of a pair of electromagnets.

It is of course possible to dispose two pairs of electromagnets, four pairs of electromagnets or more in place of the three pairs of electromagnets used in the above embodiment.

The present invention may also be practiced by providing mechanical means in addition to the power circuit in order to move the pairs of electromagnets along the nozzle.

The present invention is not limited to application to the ink jet recording head but may generally be applied to a liquid-drop ejection apparatus for ejecting a discharged fluid.

[Fourth Embodiment]

A fourth embodiment of the present invention will be described hereinafter referring to FIGS. 10–12. The same elements as in the third embodiment are indicated by the same numbers and their explanation will be omitted.

Figure 10:
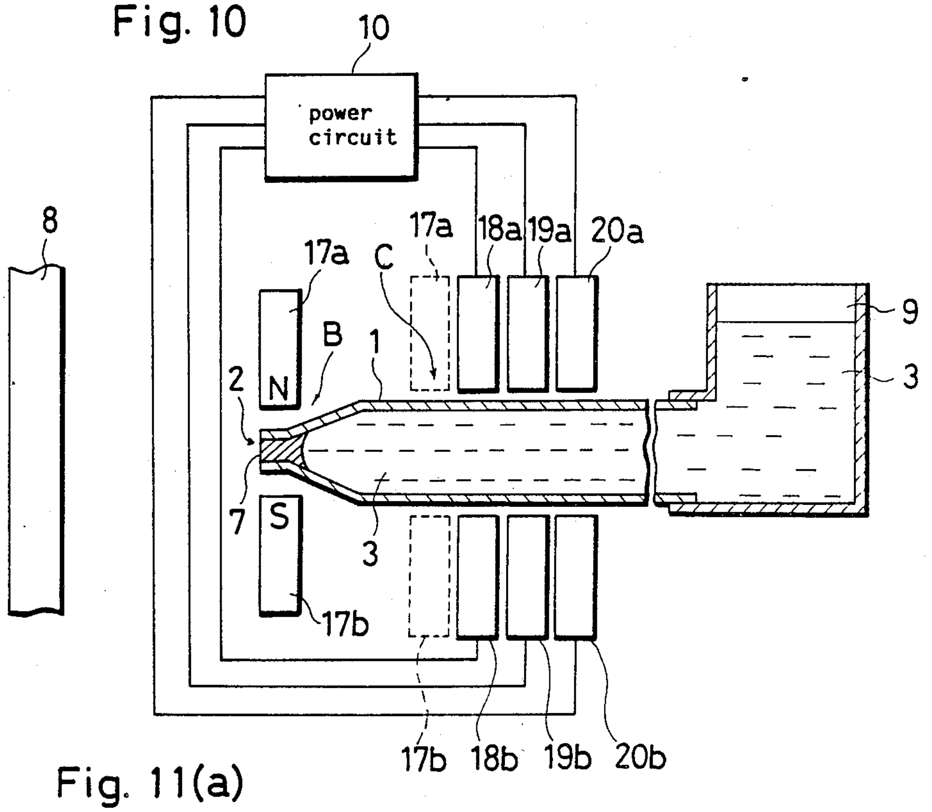
FIG. 10 is a schematic vertical section of the ink jet recording head of a fourth embodiment.

As shown in FIG. 10, a pair of magnets comprising permanent magnets are movably supported outside the orifice 2 by a supporting device (not shown) in such a manner that the two magnets are opposed with the orifice in between. The nozzle side poles of the pair of magnets 17a and 17b (hereinafter referred to as opposed poles) are set to be unlike-poles. The pair of magnets 17a and 17b are disposed at resting positions B when the head is not driven.

At appropriate distances from the proximal end of the nozzle 1, three pairs of electromagnets 18a, 18b, 19a, 19b, 20a and 20b are disposed longitudinally of the nozzle 1 in such a manner that two in each pair are opposed with the nozzle in between.

The supporting device (not shown) drives a motor when the ejection is started. Then, the pair of magnets 17a and 17b are moved to the electromagnets 18a and 18b from the resting position B along the outline of the nozzle 1. When the pair of magnets 17a and 17b reach the end C of a moving area close to the electromagnets 18a and 18b, the magnets 17a and 17b are separated from the nozzle 1 to be at waiting positions D. When the ejection is completed, the pair of magnets 17a and 17b go back to the resting positions B from the waiting positions by spring force through the reverse process of the above process.

Since the operations of the electromagnets 18a, 18b, 19a, 19b, 20a and 20b are the same as in the third embodiment, their explanation is omitted.

The above cycle is repeated a desired number of times to complete recording. Then, the power circuit 10 controls the electrification to be stopped by placing the magnetic fluid 7 in the condition shown in FIG. 11(d). At this time, the supporting means (not shown) is moved to the end C of the moving area from the waiting position D (shown in FIG. 11(d) ) by spring force. Accordingly, the magnetic fluid 7 becomes to be under the influence of the magnetic field generated by the pair of magnets 17a and 17b.

Thereafter, the magnetic fluid 7 is moved to the orifice 2 from the position under the influence of the magnetic field generated by the electromagnets 18a and 18b because the pair of magnets go back to the resting positions B by the spring force. In this case, since the opposed poles of the pair of magnets 17a and 17b are unlike-poles, the magnetic fluid 7 closes the orifice 2 as shown in FIG. 10 when the apparatus is not operated. This prevents the ink 3 from contacting air. All power sources of the head may be turned off because the pair of magnets 17a and 17b comprise permanent magnets. This leads to energy saving.

Where recording is required to be started again, the pair of magnets 17a and 17b are moved to the waiting position D from the resting positions B through the end C of the moving area by motor driving of the supporting means. The electromagnets 18a and 18b are electrified by the power circuit 10 when or before the pair of magnets 17a and 17b reach the end C of the moving area so that the opposite poles are like-poles. Thus, the movement of the magnetic fluid 7 having been moved by the pair of magnets 17a and 17b is controlled by the electromagnets 18a and 18b. At this time, the magnetic fluid 7 is divided into two portions.

Figure 11A:
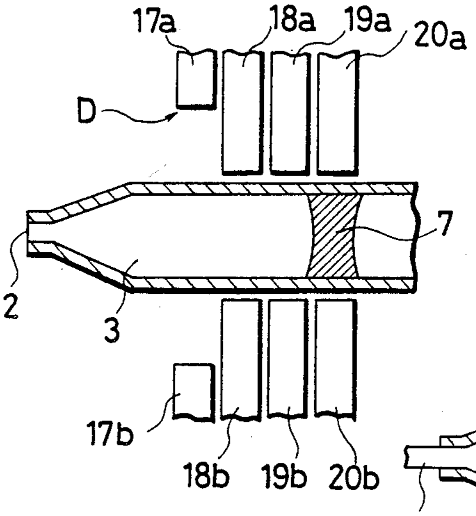
FIGS. 11(*a*)–11(*e*) are process views (vertical sections) for illustrating the ink ejection principle.
Figure 11B:
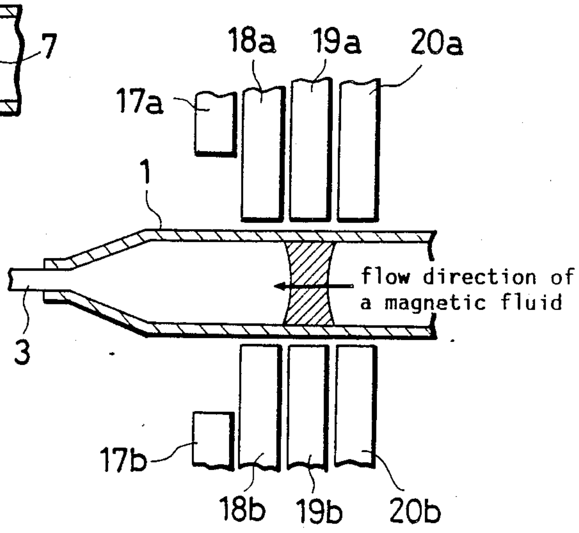
Figure 11C:
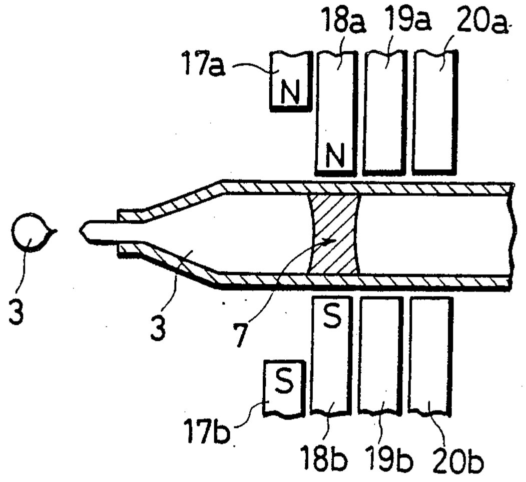
Figure 11D:
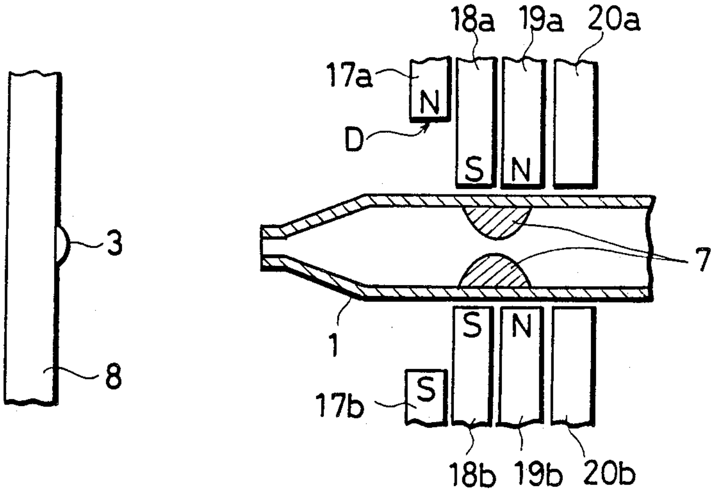
Figure 11E:
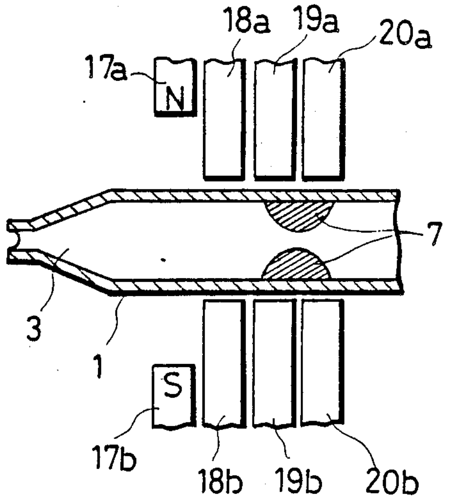
Figure 12:
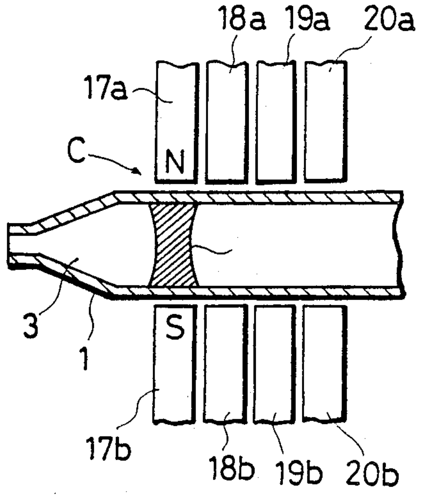
FIG. 12 is a vertical section of a pair of magnets passing through the end C of the moving area.

Thereafter, the power circuit 10 effects sort electrification control as shown in FIGS. 11(d) and 11(e). The magnetic fluid 7 is driven to the recess of the nozzle 1 for allowing the ejected to be effected immediately. Then, the ink 2 is ejected in accordance with the cycle mentioned above, whereby recording is effected.

The pair of magnets 17a and 17b are not limited to the permanent magnets but may comprise electromagnets.

The magnetic fluid 7 may be moved by a method wherein a pair of magnets comprising permanent magnets are electrified so that the opposite poles are like-poles and are moved along the nozzle mechanically, or by a method wherein the pair of magnets are sequentially moved to and from the the nozzle mechanically.

It is of course possible to employ a plurality of pairs of magnets comprising electromagnets and to control the electrification timing and the polarities of these electromagnets by a power circuit.

The present invention is not limited to application to an ink jet recording head wherein ink is ejected by deformation and movement of the magnetic fluid, but may be applied to an ink jet recording head of other types such as pulse jet type and bubble jet type.

Although the present invention has been fully described by way of exmples with reference to the accompanying drawings, it is to be noted that various changes and modifications will be apparent to those skilled in the art. Therefore, unless otherwise such changes and modifications depart from the scope of the present invention, they should be construed as being included therein.

What is claimed is:

1. A liquid-drop ejection apparatus for supplying ink from a storage device to a nozzle and ejecting said ink in the form of drops, comprising:
 a flow passage in said nozzle;
 a magnetic fluid contained, adjacent to said ink, in said flow passage, and
 means for ejecting said ink from a discharge opening, said ejecting means including:
 means for deforming the magnetic fluid by applying a magnetic force from outside the flow passage, and
 means for moving the deformed magnetic fluid along the flow passage in order to eject said ink from the discharge opening.

2. A liquid-drop ejection apparatus as claimed in claim 1, wherein said means for deforming the magnetic fluid comprises a pair of electromagnets opposed to each other with the nozzle in between.

3. A liquid-drop ejection apparatus as claimed in claim 1, wherein said means for moving the deformed magnetic fluid comprises a plurality of electromagnets disposed along the flow passage and a power circuit for changing electrification timing of the electromagnets.

4. A liquid-drop ejection apparatus as claimed in claim 1, wherein said means for deforming the magnetic fluid generates a magnetic field crossing the flow passage and deforms the magnetic fluid in order to close the flow passage, when the magnetic fluid is required to approach the discharge opening.

5. A liquid-drop ejection apparatus as claimed in claim 1, wherein said means for moving the deformed magnetic fluid generates a magnetic field substantially parallel to the flow passage and deforms the magnetic fluid in order to open the flow passage, when the magnetic fluid is required to separate from the discharge opening.

6. A liquid-drop ejection apparatus for ejecting ink selectively toward a recording member, comprising:
 nozzle means having a discharge opening of narrow size, ink supply means for supplying said ink into the nozzle means, magnetic fluid contained, adjacent to said ink, in a flow passage in the nozzle means, means for applying a magnetic force on said magnetic fluid in the nozzle means, and control means for controlling the magnetic force application on said magnetic fluid so as to close the flow passage by the magnetic fluid by means of generating a magnetic field crossing the ink flowing direction, and to move the magnetic fluid in the direction of the discharge opening while keeping the flow passage closed in order to eject the ink.

7. A liquid-drop ejection apparatus for ejecting ink selectively toward a recording member, comprising:

nozzle means having a discharge opening of narrow size;

ink supply means for supplying said ink into the nozzle means, magnetic fluid contained, adjacent said ink, in a flow passage in the nozzle means, means for applying a magnetic force on said magnetic fluid in the magnetic fluid so as to:

(a) close the flow passage by the magnetic fluid by means of generating a magnetic field crossing the ink flowing direction, (b) move the magnetic fluid in the direction of the discharge opening while keeping the flow passage closed in order to eject the ink, (c) open the flow passage by means of generating a magnetic field parallel to the ink flowing direction, and (d) move the magnetic fluid in the direction of the ink supply means while keeping the flow passage opened in order to supply the ink to the discharge opening.

8. A liquid-drop ejection apparatus for ejecting ink selectively toward a recording member, comprising:

nozzle means which has a discharge opening of narrow size, ink supply means for supplying said ink into the nozzle means, magnetic fluid contained, adjacent said ink, in a flow passage in the nozzle means, means for applying the magnetic force on said magnetic fluid in the nozzle means, which includes a pair of electromagnets opposed to each other with the nozzle means in between, and control means for changing electrification timing of the electromagnets so as to:

(a) close the flow passage by the magnetic fluid by means of generating a magnetic field crossing the ink flowing direction, (b) move the magnetic fluid in the direction of the discharge opening while keeping the flow passage closed in order to eject the ink;

(c) open the flow passage by means of generating a magnetic field parallel to the ink flowing direction, 77 and (d) move the magnetic fluid in the direction of the ink supply means while keeping the flow passage opened in order to supply the ink to the discharge opening.

* * * * *